United States Patent [19]

Linhardt

[11] Patent Number: 4,464,309

[45] Date of Patent: Aug. 7, 1984

[54] GAS TO LIQUID MASS TRANSFER DEVICE AND METHOD

[76] Inventor: Hans D. Linhardt, 1221 W. Coast Hwy., Newport Beach, Calif. 92663

[21] Appl. No.: 388,140

[22] Filed: May 14, 1982

[51] Int. Cl.³ .............................................. B01F 3/04
[52] U.S. Cl. ................................ 261/23 R; 261/79 A; 261/DIG. 54; 261/116
[58] Field of Search ............ 261/DIG. 54, 116, 79 A, 261/23 R

[56] References Cited

U.S. PATENT DOCUMENTS

| | | | |
|---|---|---|---|
| 952,970 | 3/1910 | Whitmore | 261/116 |
| 1,514,346 | 11/1924 | Sausen et al. | 261/116 |
| 1,894,696 | 1/1933 | Lindemann | 261/DIG. 54 |
| 2,214,932 | 9/1940 | Merlis | 261/DIG. 54 |
| 2,337,983 | 12/1943 | Fisher | 261/DIG. 54 |
| 2,376,298 | 5/1945 | Welp | 261/DIG. 54 |
| 2,542,014 | 2/1951 | Edwards et al. | 261/116 |
| 2,632,523 | 3/1953 | Stephens et al. | 261/DIG. 54 |
| 2,797,904 | 7/1957 | Voorheis | 261/DIG. 54 |
| 3,334,051 | 8/1967 | Kinyon et al. | 261/DIG. 54 |
| 3,707,067 | 12/1972 | Dietrick | 261/DIG. 54 |
| 3,761,065 | 9/1973 | Rich et al. | 261/DIG. 54 |
| 3,794,306 | 2/1974 | Engalitcheff, Jr. | 261/DIG. 54 |
| 4,057,602 | 11/1977 | Kolm | 261/DIG. 54 |
| 4,133,655 | 1/1979 | DeCardenas | 261/DIG. 54 |
| 4,152,126 | 5/1979 | Strahsner et al. | 261/DIG. 54 |
| 4,293,524 | 10/1981 | Teller et al. | 261/DIG. 54 |

FOREIGN PATENT DOCUMENTS 682149 9/1939 Fed. Rep. of Germany ... 261/DIG. 54
587162 4/1957 Italy ................................... 261/116

OTHER PUBLICATIONS

Schutte and Koerting Co., Bulletin 4R, 7-66, 261-DIG. 54, Cornwell Hgts, PA 19020.

Primary Examiner—Tim R. Miles
Attorney, Agent, or Firm—Jackson, Jones & Price

[57] ABSTRACT

A mass of energy transfer device is disclosed which is adapted for intermixing a liquid and a gas phase for the purpose of mass, heat or kinetic energy transfer between the phases. The transfer device includes a plurality of individual substantially tubular mixing elements each of which receives a high velocity spray of the liquid phase for substantially longitudinal travel therein and draws the gas phase into a throat and diffuser through a substantially axisymmetrical opening. The mixing elements are mounted into an enveloping vessel the interior of which is in fluid communication with a source of the gas phase. Efficiency of the device is disclosed to depend exponentially on the ratio of the momentum range of the liquid spray to the throat diameter which is related to the ratio of the slip velocity of the liquid and gas to the velocity of the gas. Throat diameters of approximately ten inches or less of each of the individual mixing elements provide capability for efficient mass transfer on practically any scale of design of the overall transfer device.

19 Claims, 8 Drawing Figures

GAS TO LIQUID MASS TRANSFER DEVICE AND METHOD

BACKGROUND OF THE INVENTION

1. Field of the Invention

The present invention is directed to a gas to liquid mass transfer device. More particularly, the present invention is directed to a mass or heat transfer device wherein large quantities of a gas composition of an industrial or chemical process or the like are efficiently treated with a liquid composition usually for the purpose of chemically or physically absorbing a component of the gas composition from the liquid composition.

2. Brief Description of the Prior Art

Devices for absorbing one or several components of a gas composition have been known in the art for a long time. Such devices, commonly termed scrubbers, operate on the principle that a stream of the gas composition is mixed with a finely dispensed spray, mist, or stream of the "scrubbing" liquid composition which absorbs the desired component of the gas either by a chemical reaction or by simple physical absorption.

As it is readily appreciated by those skilled in the art, the "scrubbing" or mass transfer process occurs on the interfacing gas liquid surfaces. Therefore an efficient mass transfer process requires thorough intermixing of the gas and liquid phases. Similarly, efficiently intermixed liquid and gas phases may also result in efficient heat or momentum (kinetic energy) exchange between the two phases.

Among the several devices utilized in the prior art for the above-noted purpose, scrubbers utilizing the venturi principle, or the countercurrent principle are of major interest as background to the present invention.

Briefly, scrubbers utilizing the countercurrent principle usually include a tower or like structure wherein the gas composition flows in an upwardly direction, and a suitable scrubbing liquid falls in the form of a fine spray or mist in a downwardly direction. In other scrubbers of the prior art which operate on the countercurrent principle, the scrubbing liquid "percolates" in a downward flow through loose packing material of the tower.

Scrubbers which utilize the venturi principle usually include a substantially tubular body having an appropriately varying cross-section along the longitudinal axis of the body. The tubular body is in fluid communication with a source of the gas composition. A stream of the suitable scrubbing liquid is sprayed into the tubular body under pressure, usually from a spray head centered on the longitudinal axis of the the tubular body. The tubular body is of a gradually decreasing cross-section downstream of the spray head, to provide a throat. Downstream of the throat the tubular body forms a diffuser of gradually increasing cross-section. Motive power of the device is provided by kinetic energy of the liquid sprayed into the device under pressure.

As is well known, the above-summarized, and other prior art scrubbing or gas-to-liquid-mass-transfer devices function acceptably in certain applications. Nevertheless, difficulties are known to arise often, when a reasonably functioning scrubbing device is used as a model for scaling-up for a larger sized scrubbing operation.

As examples, difficulties which arise in the prior art in connection with certain sulfur recovery processes are noted. Briefly, in these processes the hydrogen sulfide ($H_2S$) content of a gas composition (usually the tail gas of a hydrocarbon refining process) is extracted by chemical reaction with an appropriate chemical reagent solution. After the extraction or scrubbing is complete, the gas composition is usually discarded by release into the environment.

It is readily apparent from the foregoing that, for environmental and economic reasons, the above-noted hydrogen sulfide extraction processes must be highly efficient. Furthermore, a multitude of other commercially important, large scale chemical manufacturing processes exist wherein highly efficient removal of a gaseous component of a carrier gas composition with a suitable scrubbing liquid, is of similar importance.

While attempting to increase the scale of the gas-to-liquid-mass transfer or scrubbing process, particularly in the above-noted sulfur recovery processes, the prior art confronted the very serious problem of significantly reduced efficiency with increasing size of the above-noted venturi type scrubbing apparatus. More particularly, efficiency ($\eta$) of the gas-to-liquid scrubber (as applied to the sulfur recovery process) is defined in Equations 1 and 2.

$$\eta = 1 - 1/E \qquad \text{Equation 1}$$

wherein E is the extraction ratio. Thus, E is the ratio of hydrogen sulfide concentration in the gas composition entering the scrubber to the hydrogen sulfide gas concentration in the gas composition leaving the scrubber.

$$E = \frac{H_2S \text{ in gas composition entering}}{H_2S \text{ in gas composition leaving}} \qquad \text{Equation 2}$$

It is generally accepted in the art that, for environmental and economic reasons, in a sulfur recovery process the extraction ratio should be at least approximately one thousand (1000) ($\eta = 0.999$).

Prior art venturi scrubbers are, by and large, capable of operating with an efficiency of 0.999 (E = 1000) as long as the scrubber is relatively small. However, efficiency deteriorates rapidly when the size and operational capacity of the prior art venturi scrubber is increased by providing a larger throat diameter, or when several liquid ejectors or nozzles spray liquid into a throat of increased diameter.

Similar problems of reduced gas-to-liquid mass transfer efficiency are experienced in other processes, where in accordance with the prior art, large, industrial scale scrubbers or mass transfer devices are constructed.

Accordingly, there is a need in the prior art for an efficient gas-to-liquid mass transfer device which is adaptable for practically any scale of operation without adverse effect on its efficiency. The present invention provides such a mass transfer device.

SUMMARY OF THE INVENTION

It is an object of the present invention to provide a gas-to-liquid mass or heat transfer device which is design adaptable to operate at high efficiency at practically any scale of operation.

It is another object of the present invention to provide a high efficiency gas-to-liquid mass or heat transfer device which is economical to construct and operate.

It is still another object of the present invention to provide an efficient scrubbing device particularly adapted for large scale extraction of hydrogen sulfide from a carrier gas composition in a sulfur recovery process known under the proprietary name of BEAVON process.

These and other objects and advantages are attained by a mass or heat transfer apparatus or scrubbing device wherein a plurality of substantially tubular mixing elements are incorporated in an enveloping vessel which receives an inflow of a gas composition to be scrubbed. A suitable scrubbing liquid composition is injected in the form of a spray or mist into each separate mixing element. The gas composition enters the mixing element from the interior of the enveloping vessel through an axisymmetrical opening provided in each mixing element.

Intimate mixing of the gas and liquid occurs in each mixing element downstream of the opening. The scrubbing liquid and the exhausted gas composition are collected downstream of the mixing elements.

The features of the present invention can be best understood together with further objects and advantages by reference to the following description, taken in connection with the accompanying drawings wherein like numerals indicate like parts.

DESCRIPTION OF THE PREFERRED EMBODIMENTS

The following specification taken in conjunction with the drawings sets forth the preferred embodiment of the present invention. The embodiments of the invention disclosed herein are the best modes contemplated by the inventor for carrying out his invention in a commercial environment, although it should be understood that various modifications can be accomplished within the parameters of the present invention.

Figure 1:
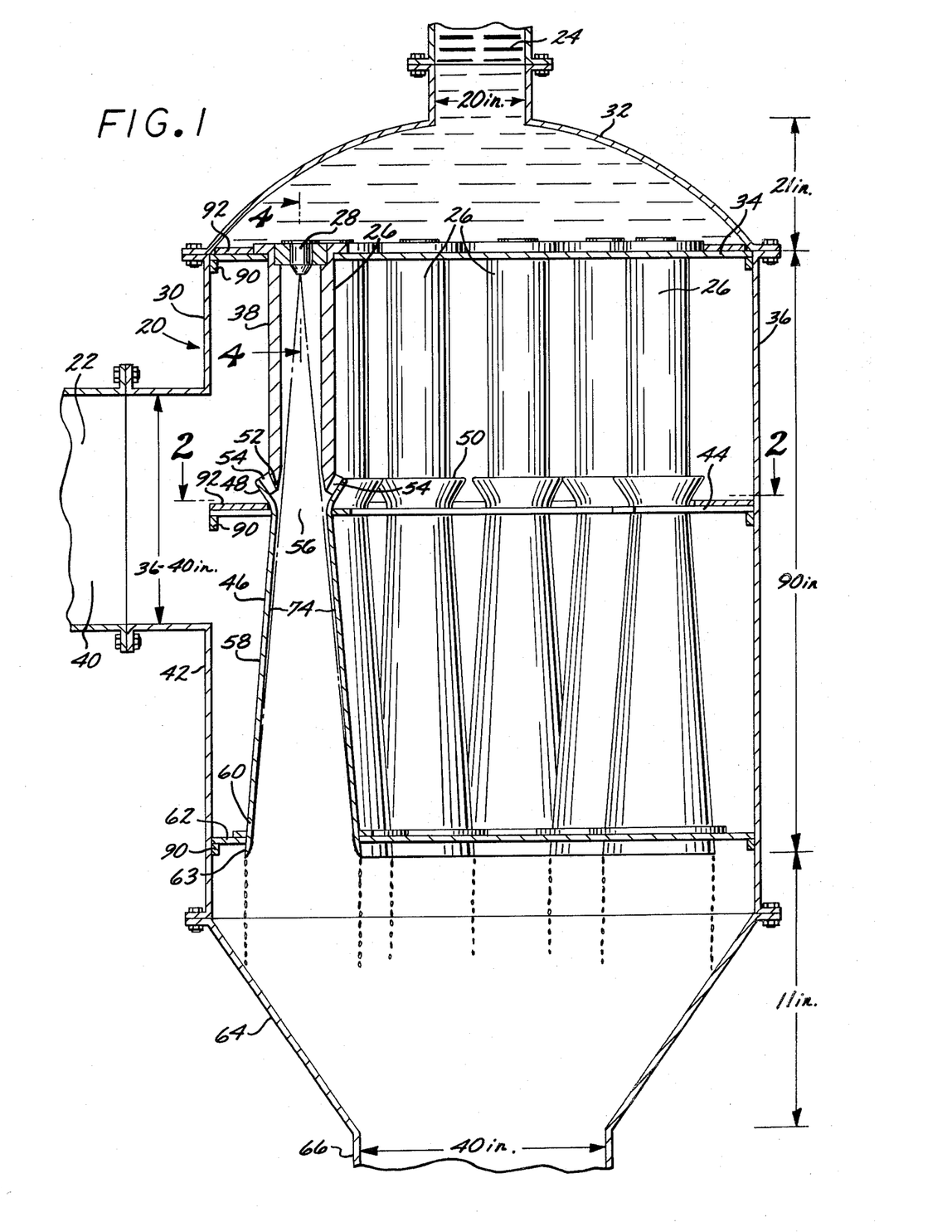
FIG. 1 is a schematic, cross-sectional view of a first preferred embodiment of a gas-to-liquid mass or heat transfer device of the present invention.

Referring now to FIGS. 1 to 5, and particularly to the schematic cross-sectional view of FIG. 1, a first preferred embodiment of the gas-to-liquid mass or heat transfer device or scrubber 20 of the present invention is disclosed. It should be noted at the outset, that a principal function of the mass or heat transfer device or scrubber 20 is to thoroughly intermix a continuously flowing stream of a gas composition 22 with a continuously flowing droplet stream of a liquid composition 24 for the purpose of providing substantially uniform and intimate contact of the gas with the liquid composition.

As is well understood in the art, any chemical reaction between the gas composition 22 and the liquid composition 24 occurs principally at the interface, or at least requires mass transfer through the interface. Similarly, simple gas-to-liquid absorption or liquid-to-gas evaporation processes also occur on or through the interface. Therefore, the efficiency of mass transfer from the gas composition 22 to the liquid composition (or vice versa) by chemical reaction, physical absorption or evaporation strongly depends on the ability of the mass transfer device to create an intimate gas-liquid interface. Similarly, the efficiency of a heat exchange process between a gas and a liquid phase is also dependent upon the intimacy of the contact between the interfacing surfaces of the two phases.

Since the mass transfer device 20 of the present invention is highly suitable for achieving a continuous, thorough and reliable temporary intermixing of a gas and a liquid phase, the exact nature of the mass (or heat) transfer process which occurs at the interface of the phases is not critical from the standpoint of the present invention. Nevertheless, in a great majority of industrial processes of importance, a component of the gas composition is to be removed by chemical or physical absorption in a suitable liquid reagent. Since this process is generally termed "scrubbing," the mass or heat transfer device 20 of the present invention is sometimes referred to for convenience, as a scrubber.

Still further, the mass transfer device 20 of the present invention is particularly suitable for use in a sulfur recovery process known by the proprietary name of "BEAVON" process. In this process the hydrogen sulfide ($H_2S$) component of a carrier gas composition must be efficiently removed by exposure to a suitable chemical reagent solution. Certain compositions of such a reagent solution are known in the art as the "STRETFORD" solution. In alternative processes of sulfur recovery the solution is known under the proprietary name "UNISULF" solution. As is known, in the process hydrogen sulfide ($H_2S$) gas diffuses into the solution to be oxidized therein to yield elemental sulfur. After the oxidation process is substantially complete, the elemental sulfur is removed from the solution. For further particulars of the above-summarized sulfur recovery process, reference is made to U.S. Pat. No. 3,752,877, the specification of which is hereby expressly incorporated by reference.

In light of the particularly advantageous application of the scrubbing device 20 of the present invention to the BEAVON sulfur recovery process, the invention is hereinafter described with particular reference to that process and particularly with reference to the step thereof wherein hydrogen sulfide ($H_2S$) is extracted from its gaseous carrier by intimate contact with the appropriate chemical reagent solution. However, it should be clearly understood that the ensuing further reference to the BEAVON process is exemplary rather than limiting in nature.

In accordance with one important aspect of the present invention, it is recognized that a mixing process of liquid particles with a gas stream in a Venturi scrubber type or like device is principally governed by the parameter $\Lambda/L$ wherein $\Lambda$ (defined by Equation 3) is the momentum range of the liquid in the gas stream, and L is a characteristic dimension of the mixing device.

$$\Lambda = 8/3 \cdot \rho L/\rho G \cdot \sigma/C_D \qquad \text{Equation 3}$$

Equation 3 defines the momentum range ($\Lambda$) by parameters known to those familiar with the art of two-phase fluid flow mechanics. Thus $\rho L$ denotes the density of the liquid composition 24, $\sigma G$ denotes the density of the gas composition, $\sigma$ denotes the average radius of the liquid droplets moving relative to the stream of gas 22, and $C_D$ denotes the drag coefficient. The drag coefficient ($C_D$) is related to the Reynolds number ($R_e$), which is defined by Equation 4.

$$R_e = \frac{2\sigma (V_d - V_g)}{\nu} \qquad \text{Equation 4}$$

In Equation 4, $\sigma$ is the average radius of liquid particles or droplets, $V_d$ is the velocity of the liquid droplets, $V_g$ is the velocity of the gas composition, and $\nu$ is the kinematic viscosity of the gas composition. The term $V_d - V_g$ is often called "slip velocity" in the art.

The numerical value of the drag coefficient ($C_D$) under circumstances and conditions prevailing during operation of the scrubber 20 of the present invention, may be obtained as a reasonably good approximation, from empirical Equation 5.

$$C_D = 17.65/R_e^{0.60} \qquad \text{Equation 5}$$

Thus it was found, in accordance with the present invention, that in the mass or heat transfer device or scrubber 20 of the present invention, and in prior art venturi type scrubbers as well, the gas-to-liquid mass transfer or extraction ratio (E as defined in Equation 2 set forth in the introductory section of the present application for patent) is interrelated with the momentum range, and with a throat diameter ($D^x$) of the scrubber 20 in the following manner (Equation 6).

$$E = e^{C \frac{Q_L}{Q_V} \cdot (\frac{\Lambda}{D^*})^{\frac{1}{2}}} \qquad \text{Equation 6}$$

In Equation 6, C is a device constant, which in most cases is approximately 375. $Q_L$ denotes the volume of liquid composition 24 passing through the scrubber 20 through a unit of time, and $Q_V$ denotes the volume of the gas composition passing through the scrubber 20 in a unit of time.

The momentum range to throat diameter ratio ($\Lambda/D^x$) is a very important governing parameter of the mass transfer or scrubbing device 20 of the present invention. In fact, the recognition of its importance is a very significant aspect of the present invention. Within the scope of the present invention, and in sharp contrast with the prior art, it is recognized that under given liquid feed conditions ($\Delta p$ constant) increasing the throat diameter ($D^*$) beyond a certain limit renders impossible or very difficult the construction of an economically and efficiently operating scrubbing device 20.

It is noteworthy that, as it follows from the foregoing relationship, the momentum range to throat diameter ($\Lambda/D^*$) ratio is proportional to the ratio of slip velocity between the liquid and gas phases ($Vd - Vg$) to the characteristic gas velocity in the mixing device, i.e., the gas velocity in the throat of the mixing element. Therefore, increased mixing or scrubbing is achievable by increasing the slip velocity to throat gas velocity ratio.

Thus, in accordance with the present invention, a mass transfer or scrubbing device 20 is constructed which has several gas-liquid mixing elements 26 with each individual element having dimensions, including a throat diameter, designed for optimum efficiency. The mass transfer device of the present invention usually has in operation a momentum range $\Lambda$ to throat diameter $D^*$ (or other characteristic length) ratio which is larger than $\Lambda/D^* > 0.10$, and preferably approaches unity (1.0). A practical $\Lambda/D^*$ range for the operating mass transfer device of the present invention is approximately $0.20 \leq \Lambda/D \leq 0.60$.

Figure 7:
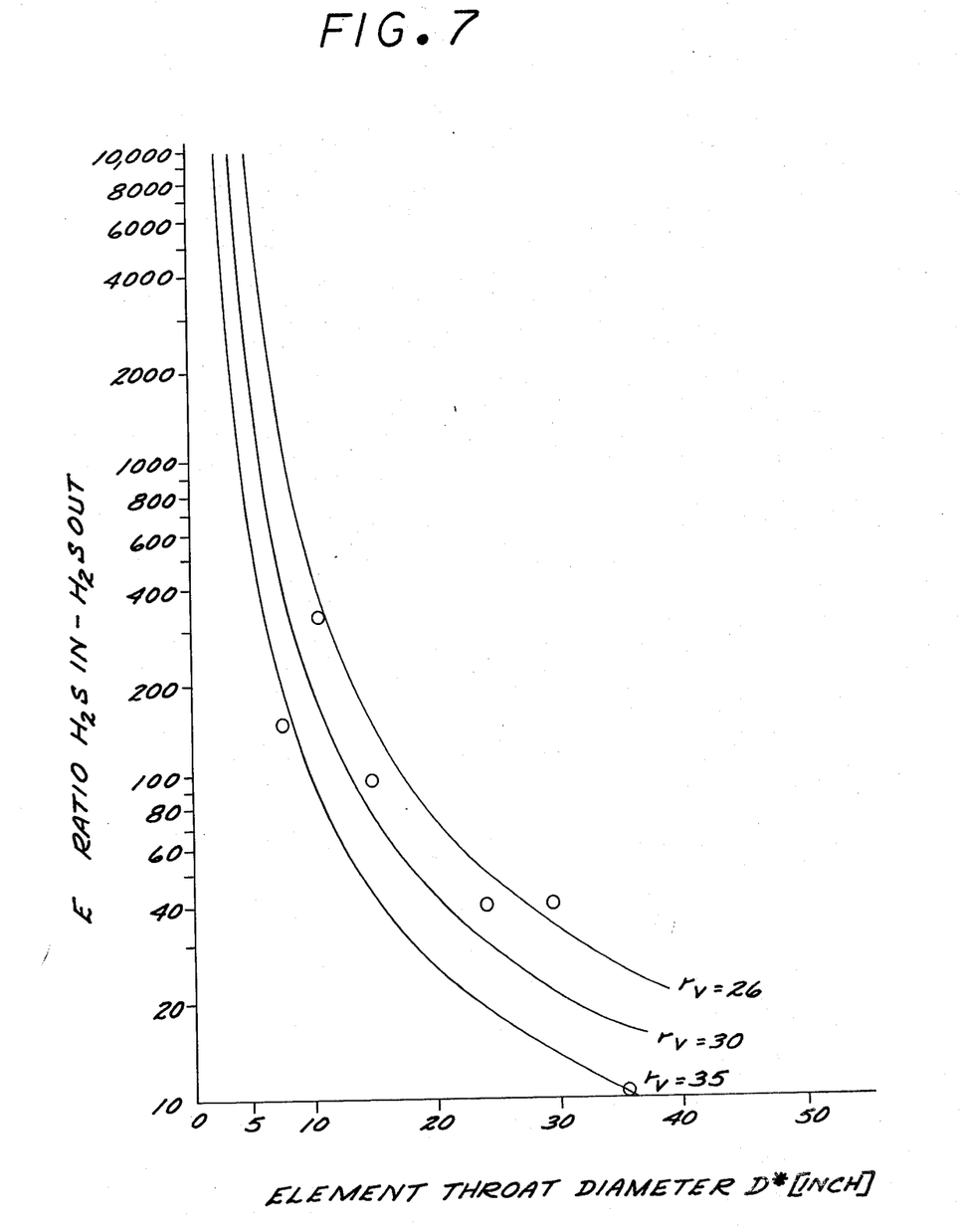
FIG. 7 is a graph showing extraction ratios of gas-to-liquid-mass-transfer devices or scrubbers principally as a function of a throat diameter of the device.

Referring now to the graph of FIG. 7, experimentally determined extraction ratios (E) are shown plotted against the throat diameter ($D^*$) in the BEAVON sulfur recovery process at different $Q_L/Q_V$ ratios. On the graph, the values indicated for $r_V$ represent $Q_V/Q_L$ (the reciprocal of the expression appearing as a factor in the exponent of Equation 6).

It is apparent from an inspection of the graph that the higher is the gas to scrubbing liquid ratio, the lesser is the extraction ratio (E) and efficiency ($\eta$). For a scrubbing device 20 used in the BEAVON sulfur recovery process on a large, industrial scale, gas-to-liquid ratios of 20–30 ($r_V \approx 20$–30) represent good compromise between economy of operation and efficiency of the hydrogen sulfide extraction as process. A gas-to-liquid ratio of 26 ($r_V = 26$) is particularly preferred.

Further inspection of the graph of FIG. 7 indicates, as it was found in accordance with the present invention, that the throat diameter ($D^x$) of the individual mixing elements 26 of the scrubbing device 20 of the present invention should be smaller than approximately ten inches, and preferably about approximately eight inches or smaller, in order to provide an extraction ratio (E) of approximately one thousand (1000.00) in the industrial BEAVON process.

In any given gas-to-liquid mass transfer or scrubbing process the respective densities of the gas composition and liquid composition are known, and the velocities of the gas composition and of liquid particles may be design influenced by selection of an appropriate spray nozzle 28 operating under a known pressure ($\Delta p$). Therefore, Equation 6, expressing the extraction ratio (E) as a function of momentum range to the throat diameter ratio ($\Lambda/D^x$), may be written in a simplified form for any given process. For the BEAVON process, having a gas-to-liquid ratio ($r_V$) of twenty-six (26), an average liquid droplet radius ($\sigma$) of one hundred (100) microns, and a pressure ($\Delta p$) for operation of the spray nozzles 28 of forty pounds per square inch (40 psi) ($\Lambda \approx 1.80$ in), the extraction ratio (E) may be expressed by exponential Equation 7:

$$E = e^{19.35 (\frac{1}{D^x})^{\frac{1}{2}}} \qquad \text{Equation 7}$$

Having explained certain fundamental theoretical design considerations for the mass transfer device of the present invention, detailed description of the same is made with reference to FIGS. 1 through 5.

Thus, FIGS. 1–5 illustrate the first preferred embodiment of the scrubber 20, specifically designed for removing hydrogen sulfide (H$_2$S) from a feed gas composition in the BEVON sulfur recovery process with an approximately 0.999 efficiency ($\eta=0.999$, $E=1000.00$) operating at the rate of twenty million standard cubic feet of feed gas per day (20 million SCFD). This exemplary device 20 is designed to have individual mixing elements having a throat diameter of eight inches ($D^x=8.0$ in.), and to operate with forty pounds per square inch (40 psi) liquid pressure ($\Delta p$) in the spray nozzles 28.

In order to handle the required amount of feed gas composition (20 million SCFD), the number of mixing elements of given throat diameter ($D^x=8.0$ in.) can be obtained by standard engineering calculations. Thus, in the herein-described first preferred embodiment, eleven (11) mixing elements 26 are incorporated in the device 20. It should, of course, be specifically understood that in alternative designs a different number of mixing elements 26 may be used. In this regard it is noted that the number of mixing elements 26 is not important for delineating the scope of the present invention. However, as it was explained above, it is an important aspect of the present invention that increased capacity of the scrubber 20 is attained by providing an increasing number of individual mixing elements 26, rather than mixing elements of ever-increasing throat diameter.

Thus, referring now principally to the schematic crosssectional view of FIG. 1, the scrubber 20 is shown to include a substantially cylindrical enveloping vessel 30. The enveloping vessel 30 is preferably disposed in an upright position so that its general longitudinal axis is aligned with the Earth's gravitational field vector. The enveloping vessel 30 is integrated with the overall sulfur recovery process in a manner customary in the art.

The enveloping vessel 30 has a substantially dome-shaped upper compartment 32 whereto the scrubbing liquid composition 24 is introduced under pressure. In the hereindescribed specific example of the sulfur recovery process, the scrubbing liquid is the STRETFORD or UNISULF solution which is introduced into the upper compartment at approximately 40 psi pressure.

A first support plate 34 separates the upper compartment 32 of the vessel 32 from its larger lower compartment 36 wherein the individual mixing elements 26 are mounted.

Referring now particularly to the left-hand side of FIG. 1, mixing element 26 is shown to have an upper tubular portion 38 which is advantageously mounted to the first support plate 34. The upper portion 38 of the mixing element 26 has a circular cross-section of substantially uniform diameter substantially along the entire length of the upper portion 38.

A spray nozzle or other liquid injecting device 28 having a single or a plurality of liquid spraying elements is mounted on the top of each mixing element 26. The spray nozzle or liquid injecting device 28 is in fluid communication with the pressurized upper compartment 32. The spray nozzle 28 injects, at a relatively high velocity, a spray or mist of the scrubbing liquid 24 into the upper tubular portion 38. Further particulars of the spray nozzle or liquid injecting device 28 are described below, particularly with reference to FIGS. 4 and 5.

The lower compartment 36 of the vessel 30 is in fluid communication with a supply of the gas composition to be scrubbed. For this purpose, in the herein-described first specific embodiment, a relatively large gas inlet opening 40 is disposed in a side wall 42 of the vessel 30.

A second support plte 44 is mounted in the vessel 30, preferably in such a manner that the second support plate 44 is at the level of the center of th gas inlet opening 40. The second support plate 44 further mounts the individual mixing elements 26 into the vessel 30. More specifically, each mixing element 26 includes a second or lower tubular portion 46. a substantially funnel-shaped upper end 48 of the second portion 46 forms a gap or slot with an end 52 of the first tubular portion 38. A plurality of vanes 54, designed to control rotation of the gas composition 22 entering the second tubular portion 46, are disposed in the gap or slot 50.

A throat 56 is found immediately downstream of the substantially funnel-shaped end 48 of the second tubular portion 46. The cross-sectional diameter of the second tubular portion 46 increases gradually so as to form an optimal diffuser 58 downstream of the throat 56.

The second tubular portion 46 of each mixing element 26 is further supported substantially at a lower end 60 thereof by a third support plate 62. The second tubular portion 46 terminates in a trailing edge 63 which causes the liquid 24 to be dispersed by the edge 63 as droplets and thereby causes a secondary mixing and scrubbing of the gas composition 22 by the liquid 24 downstream of the diffuser 58.

Still downstream of the mixing elements 26, the lower compartment 36 of the vessel 30 has a tapered section 64 which terminates in an outlet pipe 66.

Some important dimensions of the scrubber 20, designed particularly for the above-noted BEAVON sulfur recovery process having the above-noted specific operational parameters (20 million SCFD feed gas) are indicated on the schematic drawing of FIG. 1. Thus, the entire vessel 30 is approximately 122 in. long; the dome-shaped upper compartment 32 is approximately 21 in.; the length of the mixing elements 26 is approximately 90 in., and the length of the tapered section 64 is approximately 11 in. The upper tubular portion 28 of each mixing element 26 is approximately 40 in. long, and the lower or second tubular portion 46 is approximately 50 in. The diameter of the liquid inlet opening 67 of the upper compartment 32 is approximately 20 in., and the diameter of the gas inlet opening 40 is approximately 36 to 40 in. Finally, the diameter of the outlet pipe 66 is approximately 40 in. As it was stated above, eleven (11) mixing elements 26 are mounted within the vessel 30.

The basic principle of operation of the mass transfer device or scrubber 20 of the present invention should already be apparent from the above description and from an inspection of the drawing Figures. Thus, the liquid composition 24 is sprayed at a high velocity into the upper tubular portion 38 of each mixing element 26 wherein the liquid droplets travel substantially prallel with the longitudinal axis of the mixing element 26. The relatively high velocity liquid particles or droplets draw the gas composition 22 into the mixing element 26 through the gap or slot 50. As the gas composition 22 is drawn into the mixing elements 26, intimate mixing of the liquid droplets and of the gas 22 occurs, with the attendant desired chemical reaction or physical process (such as $H_2S$ removal in the BEAVON process) taking place. The intimate mixing of the gas 22 with the liquid 24 continues well into the diffuser 58 section of the mixing element 26. The mixing further continues as a secondary process downstream of the trailing edges 63 of the diffuser 58. Finally, gas 22 and liquid 24 are collected in the tail end of scrubber 20 and are removed therefrom through the outlet pipe 66.

The first preferred embodiment of the mass transfer device or scrubber 20 of the present invention is designed to operate at ambient, or substantially ambient pressure except in the upper compartment 32, where the liquid 24 is supplied at sufficient pressure to operate the spray nozzles or liquid injectors 28.

Figure 3:
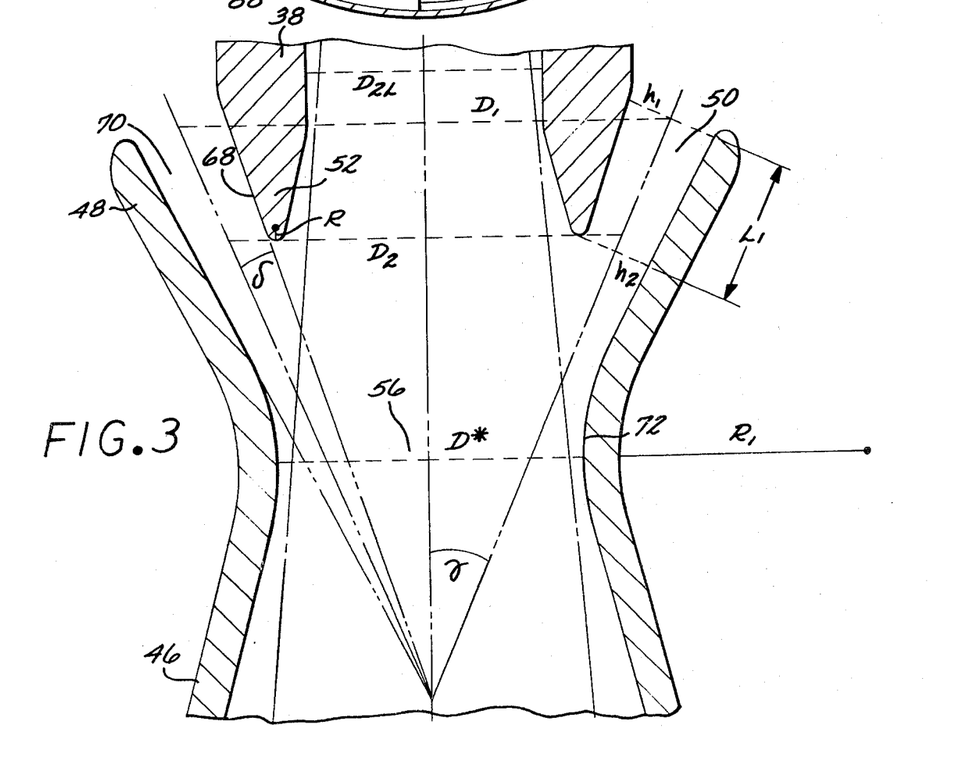
FIG. 3 is an enlarged schematic, cross-sectional view of a gas inlet and throat of an individual mixing element of the first preferred embodiment of the present invention, antirotation vanes being omitted from the view for purposes of simplicity of illustration.

For a detailed illustration of the design of the upper end 48 of the second portion 46, the design of the throat 56, and of the adjoining end 52 of the upper portion 38 of the mixing element 26, reference is made to FIG. 3. In this regard it is noted that the hereinbelow specifically disclosed exemplary dimensions and parameters are specifically adapted for achieving high mixing efficiency at a minimal loss of pressure in the gas and liquid flow. However, the geometry of the throat 56 and adjacent area can be changed for optimum mixing under uniform flow conditions when it is permissible to utilize additional driving forces in the gas, liquid or both.

Operation of the first preferred embodiment of the scrubber 20 of the present invention is a relatively energy efficient process. The gas 22 fed into the scrubber 20 need not be pressurized above ambient pressure. All motive power for the operation of the device is provided by the pressurized liquid 24.

Thus, referring again to FIG. 3, the substantially funnel-shaped end 48 of the lower portion 46 of the mixing element 26 is shown to form, together with tapering outer walls 68 of the lower end 52 of the upper tubular portion 38, a gradually narrowing annular inlet port 70 for the gas composition 22. Important parameters of the annular gas inlet port 70 are its width ($h_1$) where the gas 22 enters, and its width ($h_2$) where the gas 22 is discharged into the throat 56. Since the gas discharge port width ($h_2$) is less than the gas inlet port width ($h_1$), the gas is accelerated while travelling in the gas entry port 70 under the motive power provided by the stream of high velocity liquid particles. In the herein-described first specific embodiment of the scrubber 20, wherein the pressure of the liquid 22 above the spray nozzles 28 is approximately forty (40) psi, the liquid droplets travel in the throat 56 at an approximate velocity of sixty-five feet per second (65 fps). For simplicity of illustration, the antirotation vanes 54 are not shown on FIG. 3.

A centerline of the gas inlet port 70 with the longitudinal axis of the mixing element 26 forms the gas inlet angle $\gamma$. In the herein-shown specific embodiment, $\gamma$ is approximately 30°. The gas inlet angle in the range of approximately 30° represents an optimum for the purpose of requiring minimal energy input and yet achieving high mixing efficiency. In alternative embodiments of the mixing elements 26, the angle may range up to 150°. This is described in more detail below in connection with FIG. 8.

Further design dimensions of the mixing element 26, and particularly of the throat 56 are: the throat diameter ($D^x$); the average diameter ($D_1$) of the annular gas inlet port 70 at the gas entry point; the average diameter ($D_2$) of the annular gas inlet port 70 in the gas discharge area; the internal diameter ($D_{2L}$) of the first or upper tubular portion 38 and the length ($L_1$) of the gas inlet port 70.

The tapering lower end 52 of the upper portion 38 of the mixing element 26 is curved, as shown in FIG. 3, having a curvature R. The substantially funnel-shaped end 48 of the second tubular portion 46 also includes a curved wall 72 in the throat area 56. The curvature of the curved wall 72 is designated $R_1$. Walls of the mixing element 26 which form the gas inlet port 70 describe an angle ($\delta$) with the centerline of the inlet port 70. In other words, $\delta$ is the half-cone angle of the gas inlet port 70.

Table I indicates numerical values for the above-noted parameters or dimensions of the mixing element 26, specifically shown on FIG. 3. Alternatively, where more appropriate for efficient mixing element design, ratios rather than numerical values of certain dimensions are provided in Table I.

TABLE I

| | | |
|---|---|---|
| $\gamma$ | = | 30° |
| $D_2/D^x$ | = | 1.25 |
| $D^x$ | = | 8 in. |
| $h_2/D^*$ | = | 0.20 |
| $D_1/D_2$ | = | 1.5 |
| $L_1/h_2$ | = | 3.125 |
| $\delta$ | = | 6.65° |
| $R_1/D^x$ | = | 0.825 |
| $R/h_1$ | = | 0.5 |
| $D_{2L}/D_2$ | = | 0.6–0.75 |

Figure 4:
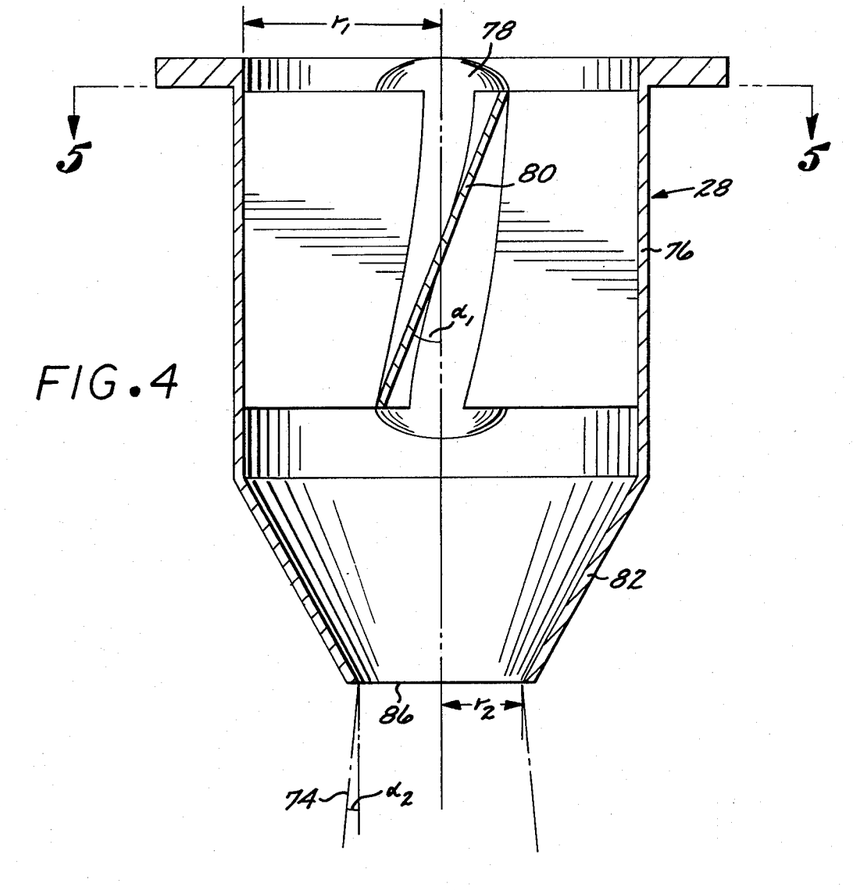
FIG. 4 is a schematic cross-sectional view of a spray nozzle of an individual mixing element of the first preferred embodiment of the present invention.
Figure 5:
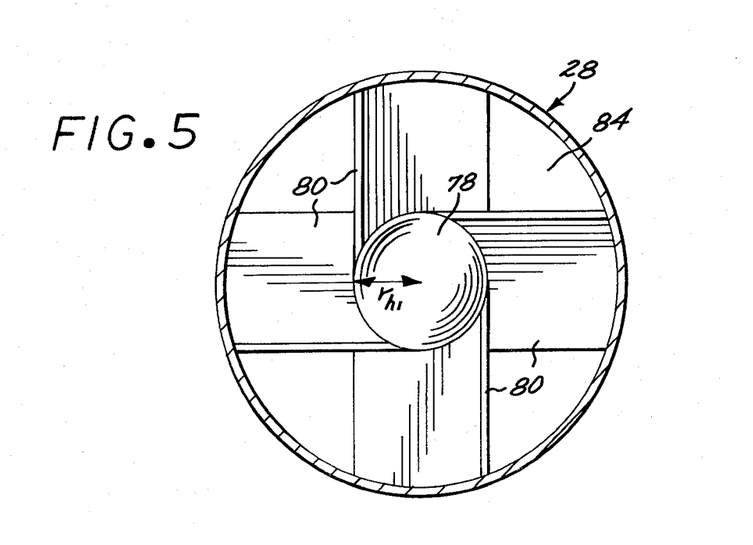
FIG. 5 is a top view of the spray nozzle shown on FIG. 4.

Referring now to the schematic views of FIGS. 4 and 5, the construction of the spray nozzles 28 and their utilization in the present invention is explained. It should be noted in this regard that an important requirement for the operation of the mass transfer or scrubbing device 20 of the present invention is, that liquid droplets of appropriately small dimensions be injected into the mixing elements 26 for substantially longitudinal travel therein, for providing a substantially uniform flow, and in the first preferred embodiment for providing at least a significant portion of the motive power or energy which draws the gas composition 22 into the mixing elements 26.

Therefore, the spray nozzle or liquid injecting device 28 may comprise any one of the several devices customarily used in the art for this purpose, as long as the above-noted requirements are satisfied. The spray nozzle 28 must also generate the liquid droplets with the average or mean diameter for which the entire scrubber 20 is designed. This is described above in detail, particularly in conjunction with Equations 3, 4, 5 and 6.

Thus, various liquid injecting, dispersing or spraying devices may be incorporated into the scrubber 20 of the present invention as long as the above-noted requirements are satisfied. Nevertheless, as a further advantageous feature of the present invention, the spray nozzle or liquid injecting device 28 of the first preferred embodiment is specifically adapted for providing substantially optimal mixing efficiency with minimal pressure loss. More particularly, in the herein-described preferred embodiment of the mass transfer device or scrubber 20, each spray nozzle 28 is designed to provide a substantially hollow spray cone 74 of liquid droplets of approximately 100 to 200 micron average diameter. Furthermore, the spray cone 74 is of such dimensions that approximately 10 to 15% of the throat 56 area is free of liquid. Still further, the vast majority of liquid droplets do not come into contact with the walls of the mixing elements 26 substantially until the end of the diffuser part 58 of the mixing element is reached. In other words the cone angle (or half-cone angle) of the spray cone 74 is selected in such a manner that the spray cone 74 meets the wall of the diffuser 58 only substantially adjacent to the end thereof.

It should be readily apparent from the foregoing, that the above-noted design of the spray cone 74 promotes the high efficiency of the gas liquid mixing process. This is because if liquid was to hit the walls of the mixing element substantially above the diffuser 58, then the liquid would merely run down the walls and would not be efficiently mixed with the gas.

It should be further apparent from the foregoing that the above-noted characteristics of the spray cone impose certain requirements on the geometry of the entire mixing element. The hereinabove-disclosed specific dimensions of the first preferred embodiment are designed to meet these geometrical requirements with a spray cone half-angle ($\alpha_2$) of approximately 4°–5.4°, and a diffuser 58 included angle of 7°–10°.

Referring now again to FIGS. 4 and 5, the specific construction of the spray nozzle or liquid injecting device 28 is shown. Thus, the spray nozzle 28 includes a substantially cylindrical, hollow body 76, which has a centrally located hub 78. A plurality of vanes 80 angularly disposed relative to the longitudinal (vertical) axis of the spray nozzle 28 interconnect the hub 78 with the cylindrical body 76. A hollow, conical, outlet section 82 is disposed below the cylindrical body 76. Although FIGS. 4, 5, for simplicity of illustration, show only four (4) vanes 80, the spray nozzle 28 preferably contains a larger number of vanes 80. During operation, the liquid composition 24 enters the spray nozzle 28 through an opening 84 located on top of the cylindrical body 76. The liquid composition is supplied under the design pressure ($\Delta P$), approximately forty (40) psi in the herein-disclosed specific embodiment. The vanes or blades 80 impart a rotation to the liquid 24, and the liquid 24 leaves a discharge opening 86 of the conical outlet section 82 as the substantially hollow spray cone 74.

Important design dimensions of the spray nozzle 28 include the following: the inner radius ($r_1$) of the cylindrical body 76 measured from the center of the hub 78; the radius ($r_{h1}$) of the hub 78 (shown on FIG. 5); the radius ($r_2$) of the liquid spray cone discharge opening 86, and the angle ($\alpha_1$) of the vanes or blades 80 relative to the axis of the spray nozzle 28.

It was discovered in accordance with the present invention that the above-noted dimensions and parameters of the spray nozzle 28 bear the following relationship relative to one another (Equation 8).

$$\tan \alpha_2 = \frac{\tan \alpha_1 \frac{r_2}{r_1}}{f_B(1-\psi^2)} \quad \text{Equation 8}$$

In Equation 8, $f_B$ represents an experimentally determinable blockage factor which accounts, inter alia, for thickness of the blades or vanes 80. $f_B$ ranges approximately between the values of 0.85 to 0.90 for spray nozzles 28 of the 8 type utilized in the present invention. $\psi$ is the ratio ($r_{h1}/r_1$) of the hub radius ($r_{h1}$) to the radius ($r_1$) of the cylindrical body 76.

Thus, the several parameters of the spray nozzle 28 can be calculated utilizing Equation 8, to provide a hollow spray cone 74 of the desired half-cone angle.

Actual numerical values, or when more appropriate for optimal spray nozzle design certain ratios thereof, of the spray nozzle 28 of the hereindisclosed specific embodiment, are provided in Table 2.

TABLE 2

| | | |
|---|---|---|
| $\alpha_2$ | = | 5.40 |
| $f_B$ | = | 0.90 |
| $r_{h1}$ | = | 0.875 in. |
| $r_1$ | = | 1.75 in. |

TABLE 2-continued

| | | |
|---|---|---|
| $r_2$ | = | 0.80 in. |
| $\alpha_1$ | = | 8.0° |
| $\Delta P$ | = | 40 psi |

In alternative embodiments of the spray nozzle 28, the vanes or blades 80 may be adjustably mounted to permit gradual change of their angle ($\alpha_1$) relative to the axis of the spray nozzle 28. This permits precise adjustment to provide the liquid spray cone 74 of the appropriate dimension in relation to the actually used pressure ($\Delta P$), and mixing element 26 dimensions.

Figure 8:
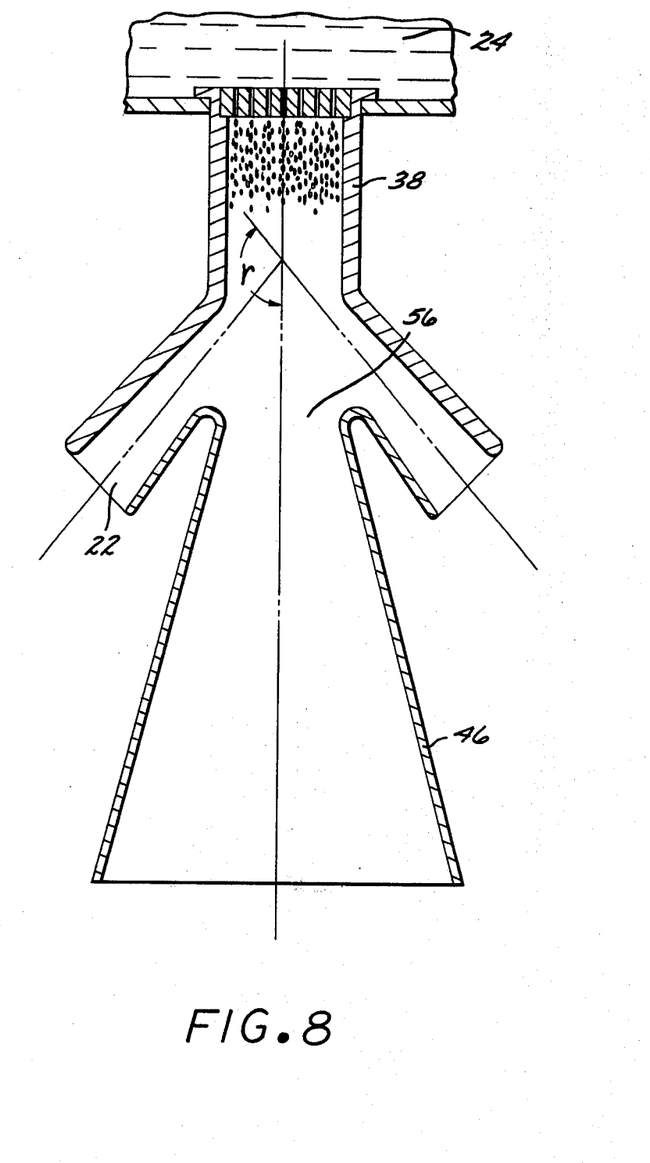
FIG. 8 is an enlarged, schematic cross-sectional, partial view of an individual mixing element of a second preferred embodiment of the present invention.

Referring now to FIG. 8, the throat 56 and adjacent area of a second preferred embodiment of the gas-to-liquid mass transfer device of the present invention is disclosed. A principal characteristic of the second preferred embodiment is the large turning angle ($\gamma$) which the gas 22 undergoes prior to entry into the throat 56. In the herein-shown second preferred embodiment, the gas inlet or turning angle ($\gamma$) is approximately 150°. Generally speaking, a larger gas inlet or turning angle results in higher slip velocity and more efficient mixing. However, a higher turning angle also results in a higher pressure drop, and therefore requires a higher energy input. In application of the present invention to certain processes, the higher efficiency of mixing may be desirable and the attendant higher pressure drop may be tolerated.

In addition, the throat 56 of the second preferred embodiment is designed to receive, instead of a spray cone, a substantially uniform liquid droplet spray from multiple spraying elements associated with each mixing element.

Still further, instead of providing a predominant or significant portion of the motive power to the mixing element by liquid pressure, the gas composition 22 may be pressurized to overcome the pressure drop caused by the large turning angle, and thus provide intimate mixing with the uniformly flowing fine spray received from above.

Referring now again principally to FIG. 1 and to the cross-sectional view of FIG. 2, the specific manner of mounting the mixing elements 26 within the enveloping vessel 30 of the first preferred embodiment is shown. It should be noted in this regard, that the exact spacing of the mixing elements 26 within the vessel 30 becomes, to some extent, a matter of design choice in light of the present disclosure. Important considerations in spacing and supporting of the mixing elements 26 are simplicity of construction and the ability of the gas composition 24 to enter the mixing elements 26 substantially uniformly with regard to each element 26. It is also highly preferred that the gas flow should enter each element substantially axisymmetrically relative to the longitudinal axis of the element 26. In other words, the gas flow should be substantially uniform in the annular inlet port 70.

The spacing of the mixing elements 26 of the herein-shown first preferred embodiment accomplishes the above-noted objectives. More specifically, the tubular mixing elements 26 are disposed with their respective centers evenly spaced and located on a circle which is concentric with the cylindrical lower compartment 36 of the vessel 30. Each mixing element 26 is supported by the three support plates 34, 44 and 62, and is mounted into elongated slots 88 provided in the respective support plates. The support plates 34, 44, and 62, in turn, are supported by internal flanges 90 of the vessel 30.

The upper and lower portions 38 and 46 of each mixing element 26 may be mounted into the slots 88 of the respective support plates 34, 44, 62 as one preassembled unit, held together, for example, by welding the vanes 54 to both portions 38 and 46 of the mixing element 26. Alternatively, each mixing element 26 may be assembled as two separate pieces. In this case the vanes 54 are assembled into the gap or slot 50 after the mixing element 26 is in place. The mixing elements 26 are retained on the first and second support plates 34 and 44 by appropriate retainer rings 92. The retainer rings 92 may be of a unitary, or split construction depending on whether the mixing elements are assembled in a unitary or two-piece fashion.

Figure 2:
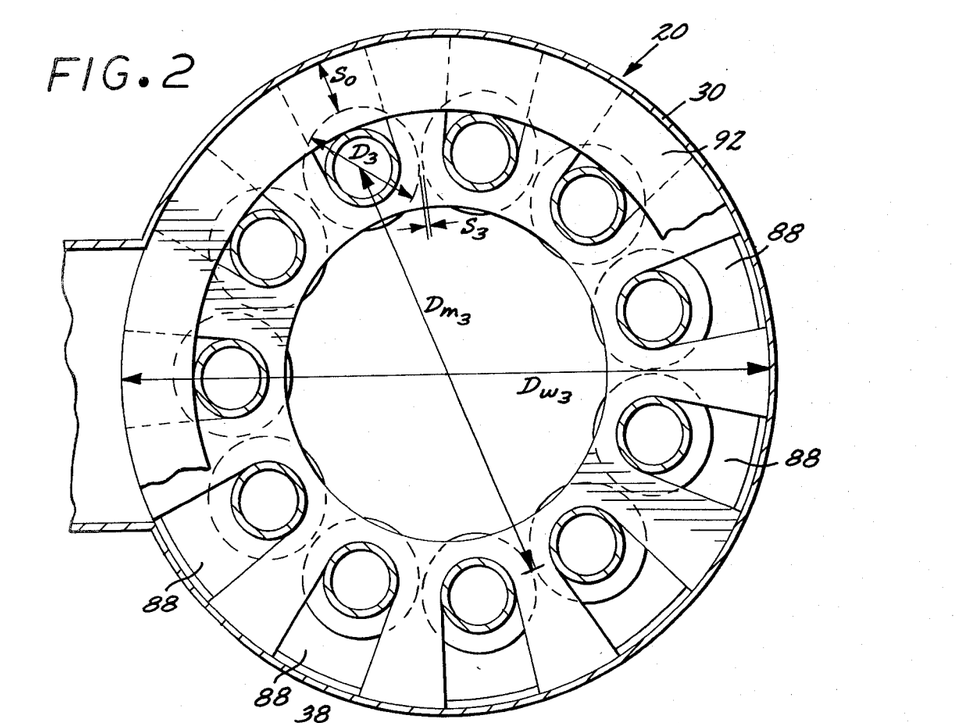
FIG. 2 is a schematic cross-sectional view of the first preferred embodiment, the cross-section being taken on lines 2,2 of FIG. 1.

Important design dimensions and parameters regarding the spacing of the mixing elements 26 in the herein-described specific embodiment include the following: the inner diameter ($D_{w3}$) of the cylindrical vessel 30; the outer diameter ($D_3$) of the mixing element 26 where the diffuser section 58 is supported by the third support plate 62; the diameter ($D_{m3}$) of the circle (imaginary) wherein the respective centers of the mixing elements 26 are located, the distance ($S_0$) of the mixing elements 26 from the wall of the vessel 30 at the level of the third support plate 62, and the spacing ($S_3$) between the mixing elements 26 on the same level.

As it was noted above, the number of mixing elements 26 is principally determined by the desired capacity of the mass transfer device 4 or scrubber 20. The spacing ($S_3$) between the mixing elements 26 and the vessel diameter ($D_{w3}$) are principally determined by the requirement for uniform and relatively slow gas flow within the lower compartment 36.

In the herein-described first specific embodiment, the above-noted dimensions bear the following relationship to one another (Equation 9).

$$\frac{D_{m3}}{D_3} = \frac{\left(1 + \frac{S_3}{D_3}\right) n}{\pi} \quad \text{Equation 9}$$

In Equation 9, n denotes the number of mixing elements 26; n is eleven (11) for the herein-described specific embodiment. Since the value of $S_3/D_3$ is selected for the first preferred embodiment to be in the range of 0.152 to 0.175, $D_{m3}/D_3$ computes to be approximately four (4) (Equation 9).

The above-noted exemplary design calculations for the several components of the novel mass transfer device or scrubber 20 of the present invention are believed to enable a person having ordinary skill in the art to adapt the device of the present invention for a great variety of mass or heat transfer applications. As is well appreciated by those skilled in the art, several characteristics of the process wherein the mass transfer device is used may impose requirements for operating pressure ($\Delta P$), production capacity, mean liquid droplet size ($2\sigma$), efficiency ($\eta$) and the like.

Figure 6:
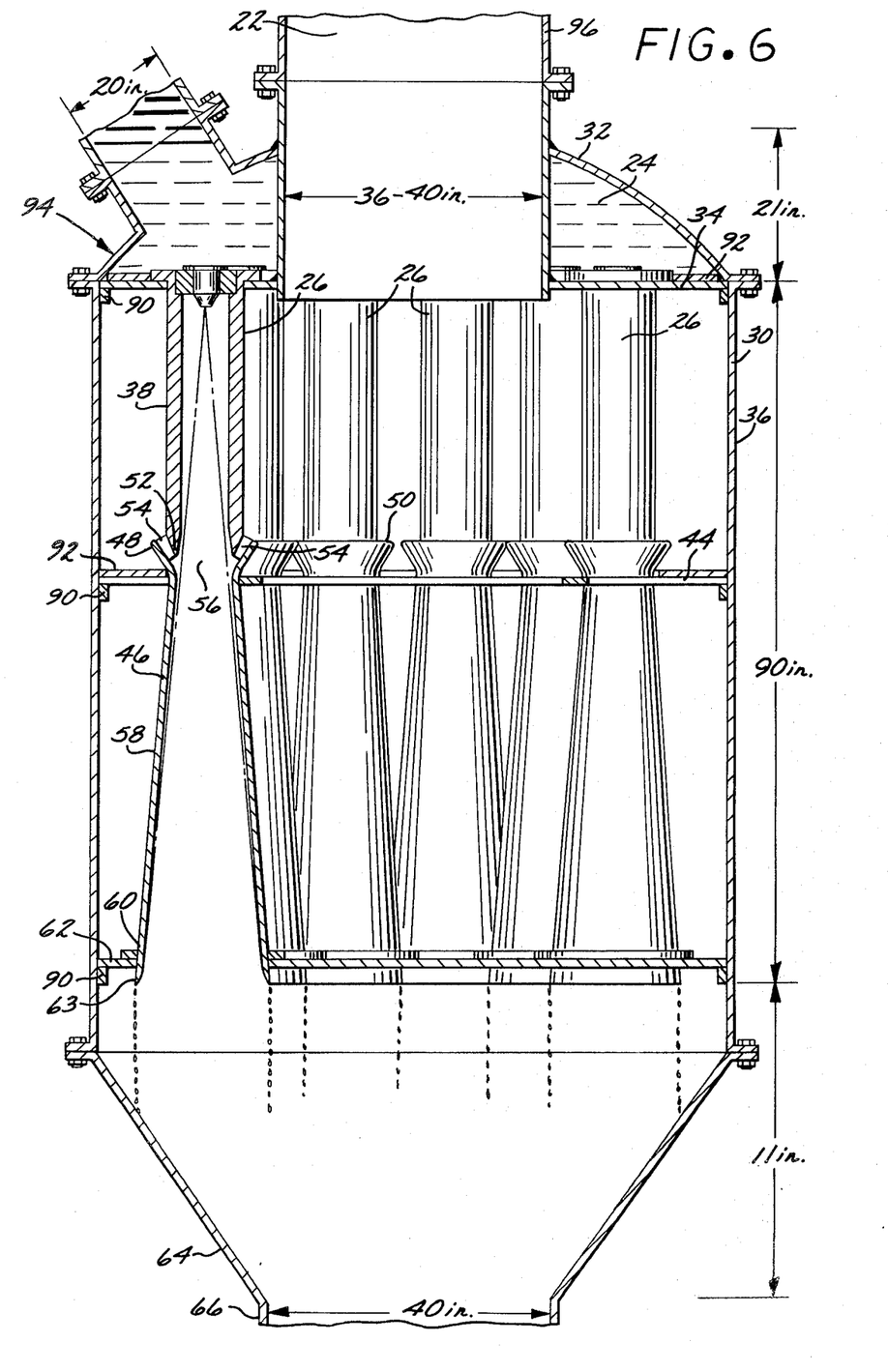
FIG. 6 is a schematic cross-sectional view of a third preferred embodiment of the gas-to-liquid mass transfer device of the present invention.

FIG. 6 illustrates a third preferred embodiment 94 of the mass transfer device or scrubber of the present invention. As is apparent from the drawing Figure, the third preferred embodiment 94 principally differs from the first preferred embodiment only in that supply of the gas composition is through a centrally located supply tube 96 which enters the lower compartment 36 from the top thereof. As it should be apparent from the drawing Figure, the gas flow in the second preferred embodiment is also substantially uniform with regard to each mixing element 26.

Still further modifications of the mass or heat transfer device of the present invention may become readily apparent to those skilled in the art in light of the above disclosure. One apparent modification is, for example, a device wherein the gas inlet port 70 and the throat 56 are disposed immediately below the spray nozzle 28. However, in this embodiment the liquid pumping or spray nozzle 28 operating pressure is likely to be higher than in the herein-before disclosed first preferred embodiment.

The mass transfer device of the present invention is also readily adapted to processes where, for reasons inherent in the process, the gas composition is pressurized above ambient pressure. In such a case, the operating pressure or liquid pumping pressure ($\Delta P$) of the device is the difference between the pressure of the incoming liquid and gas composition.

Another apparent modification is one where the upper compartment 32 of the enveloping vessel 30 is eliminated, and the spray nozzles or liquid injectors 28 are individually supplied with the liquid composition 22 through suitable pipes (not shown).

Since still further modifications of the present invention may become apparent to those skilled in the art in light of the above disclosure, the scope of the present invention should be interpreted solely from the following claims.

What is claimed is:

1. An apparatus for exposing a gas composition to a liquid composition for temporarily intimately mixing said compositions for the purpose of effectuating mass or energy transfer between said compositions, the apparatus comprising:

first elongated duct means for providing a conduit for a substantially dispersed stream of the liquid composition, said first duct means having a first end;

second elongated duct means disposed substantially coaxially with the first duct means for providing a conduit for a mixed stream of the liquid and gas compositions, the second duct means having a first end disposed adjacent to the first end of the first duct means so as to provide a gas inlet port between the first and second duct means for permitting entry of the gas composition into the second duct means, the second duct means including a throat disposed adjacent the first end and an outwardly expanding diffuser section located downstream from the throat, the throat diameter being less than ten inches;

liquid injecting means operatively associated with the first duct means for injecting said liquid composition into the first duct means, for dispersing said liquid composition into droplets, for causing said droplets to travel substantially along the longitudinal axes of the first and second duct means and for providing a momentum range of the liquid droplets in the gas composition to the throat diameter of the second duct means of between 0.10 and 1.0; and collecting means operatively associated with the second duct means for collecting said liquid composition and said gas composition from said second duct means.

2. The apparatus of claim 1 wherein the first and second duct means and the liquid injecting means are arranged to provide a gas-liquid ratio within the second duct means of twenty to thirty and a momentum range of the liquid droplets in the gas composition to the throat diameter of the second duct means of between 0.20 and 0.60.

3. The apparatus of claim 1 wherein the throat diameter is about eight inches.

4. The apparatus of claim 1 wherein the second duct means has a second end which terminates in a trailing edge to cause the composition to be dispersed from the edge as droplets thereby causing a secondary mixing of the gas composition with the liquid composition downstream from the diffuser.

5. The apparatus of claim 1 wherein the gas inlet port is axisymmetrical with respect to the longitudinal axes of the first and second ducts and is arranged to cause the gas composition to have a turning angle relative to the longitudinal axis of the second duct means which is greater than 90°.

6. The apparatus of claim 5 wherein the liquid injecting means are adapted for dispersing said liquid composition into liquid droplets having an average droplet diameter of approximately 100–200 microns.

7. The apparatus of claim 6 wherein the liquid injecting means are adapted for dispersing the liquid composition into a form of droplets travelling in the substantially hollow cone having a half-cone angle of approximately 5.4°.

8. The apparatus of claim 1 wherein the liquid injecting means are adapted for injecting said liquid composition into the first duct means in a form of droplets travelling in a substantially hollow cone, a substantial majority of said droplets avoiding hitting walls of the first duct means, and hitting walls of the second duct means only substantially downstream from the slot.

9. The apparatus of claim 8 wherein the first duct means are approximately 40 in. long, and wherein the second duct means are approximately 50 in. long.

10. A method of effectuating mass or energy transfer between a gas and liquid composition in a venturi scrubber type device having first and second elongated ducts arranged serially along a common axis with a gas inlet port formed between the ducts, the second duct having a throat section downstream from the gas inlet port and a diffuser section downstream from the throat, comprising the steps of:
(a) surrounding the gas inlet port with the gas composition;
(b) injecting the liquid composition into the first duct along the common axis to provide a substantially dispersed stream of the liquid composition in droplet form traveling through the first and second ducts and to educt the gas composition through the gas inlet port and into the liquid composition so that the resulting ratio of the momentum range of the liquid droplets in the gas composition to the throat diameter is between 0.10 and 1.0, and
(c) collecting the liquid composition from the gas composition from the second duct.

11. The method of claim 10 wherein the liquid composition is injected into the first duct in the form of droplets traveling in a substantially hollow cone with a substantial majority of the droplets hitting the walls of the ducts only downstream from the throat and wherein the ratio of momentum range of the liquid droplets to the throat diameter is between 0.20 and 0.60.

12. The method of claim 11 wherein the liquid composition is injected into the first duct so that the average droplet diameter is within the range of 100–200 microns.

13. The method of claim 11 including the step of controlling the ratio of the injected liquid composition to the educted gas composition within a range of twenty to thirty.

14. An apparatus for exposing a gas composition to a liquid composition for effectuating efficient mass or energy transfer between said compositions, the apparatus comprising:
(1) a substantially hollow enveloping vessel having upper and lower compartments;
(2) liquid composition inlet means operatively associated with the enveloping vessel for allowing the liquid composition to enter into the upper compartment of the enveloping vessel under pressure;
(3) gas composition inlet means operatively associated with the enveloping vessel for allowing the gas composition to enter into the lower compartment;
(4) a plurality of mixing elements disposed within the enveloping vessel, each mixing element comprising:
(a) an elongated duct having first and second portions and a substantially straight longitudinal axis for providing a substantially dispersed stream of the liquid composition, the first portion having an upper and lower end and the second portion having an upper and lower end with the upper end thereof disposed adjacent to the lower end of the first portion to provide a substantially annular gas inlet port disposed between the first and second portions of the duct, the annular gas inlet being in fluid communication with the lower compartment to permit gas composition to be educted into the second portion of the duct, the second portion of the duct including a restriction in the form of a throat disposed adjacent the upper end and a diffuser section of gradually increasing diameter located downstream from the throat, the internal diameter of the throat being less than 10 inches;
(b) liquid injection means operatively associated with the upper end of the first portion of the duct and connected to the first compartment for injecting the liquid composition into the duct in the form of droplets, and for causing said droplets to travel substantially along the longitudinal axis of the duct, the injection means, the gas inlet port, the throat and the diffuser section being arranged to provide a momentum range of the liquid droplets in the educted gas composition to the throat diameter of between 0.20 and 0.60 and a gas to liquid ratio of between 20 to 30; and (5) liquid composition collecting means operatively associated with the lower ends of the duct of each mixing element for collecting said liquid and composition after said mass or heat transfer between the liquid and gas composition has taken place in the second ducts.

15. The apparatus of claim 14 further comprising a plurality of vanes disposed in the gas inlet port, said vanes comprising means for controlling rotation of the gas composition during and after entry into the elongated duct of each mixing element.

16. The apparatus of claim 14 wherein the elongated duct of each mixing element is approximately ninety inches long.

17. The apparatus of claim 16 wherein each injecting means are adapted for injecting the liquid composition into the elongated duct in the shape of a substantially hollow spray cone.

18. The apparatus of claim 17 wherein the hollow spray cone is substantially out of contact with walls of the elongated duct above said restriction.

19. The apparatus of claim 18 wherein the half cone angle of the hollow spray cone is approximately 4° to 5.4°.

* * * * *